United States Patent [19]

Cowen et al.

[11] Patent Number: 5,593,736

[45] Date of Patent: Jan. 14, 1997

[54] PROCESS FOR MANUFACTURING A FIBER REINFORCED OPTIC MICROCABLE WITH A UV CURED RESIN

[75] Inventors: Steven J. Cowen; Christopher M. Young, both of San Diego; James H. Dombrowski, Encinitas; Michael E. Kono, Carlsbad; James H. Daughtry, San Diego, all of Calif.

[73] Assignee: The United States of America as represented by the Secretary of the Navy, Washington, D.C.

[21] Appl. No.: 199,820

[22] Filed: May 26, 1988

[51] Int. Cl.⁶ ............................ C08F 2/48; C03C 25/02; G02B 6/22; G02B 6/44
[52] U.S. Cl. .............................. 427/492; 65/409; 65/425; 65/447; 65/450; 264/1.38; 427/163.2; 427/358; 427/513
[58] Field of Search ............................ 65/3.4, 3.41, 3.43, 65/409, 441, 447, 450; 264/1.5, 1.38; 427/163, 44, 163.2, 493, 513, 358, 492

[56] References Cited

U.S. PATENT DOCUMENTS

| | | | |
|---|---|---|---|
| 3,253,896 | 5/1966 | Woodcock et al. | 264/1.5 |
| 3,255,280 | 6/1966 | Burrowes | 264/1.5 |
| 4,099,837 | 7/1978 | Vazirani | 427/163 X |
| 4,269,024 | 5/1981 | Ashpole et al. | 264/1.5 |
| 4,324,575 | 4/1982 | Levy | 264/1.5 X |
| 4,388,093 | 6/1983 | Kimura et al. | 65/3.4 X |
| 4,410,567 | 10/1983 | France et al. | 427/163 |
| 4,541,970 | 9/1985 | Caverly, Jr. et al. | 264/1.5 |
| 4,575,184 | 3/1986 | Ueno et al. | 350/96.23 |
| 4,629,285 | 12/1986 | Carter et al. | 350/96.23 |
| 4,666,244 | 5/1987 | Van der Velde et al. | 350/96.23 |
| 4,725,453 | 2/1988 | Nakasone et al. | 427/163 |
| 4,769,286 | 9/1988 | Le Noane | 65/3.4 X |
| 4,770,898 | 9/1988 | Sugai et al. | 264/1.5 X |
| 4,792,347 | 12/1988 | Deneka et al. | 65/3.4 X |
| 4,874,415 | 10/1989 | Boniort et al. | 65/3.4 X |
| 4,886,562 | 12/1989 | Pinson | 427/163 |

*Primary Examiner*—Richard D. Lovering
*Attorney, Agent, or Firm*—Harvey Fendelman; Michael A. Kagan; Peter A. Lipovsky

[57] ABSTRACT

The invention provides a process for fabricating a fiber optic microcable composed of materials having properties which facilitate its manufacture. The microcable is comprised of an optical fiber core, a buffer surrounding the core, and a protective sheath surrounding the buffer consisting of an electromagnetic radiation cured resin impregnated with fibers suspended in the resin to enhance the resistance of the microcable to physical damage. The microcable is fabricated by soaking the fibers in an electromagnetic radiation curable resin, placing the wetted fibers around the core and buffer to form a matrix, and then irradiating the matrix with electromagnetic radiation to cure the resin.

19 Claims, 5 Drawing Sheets

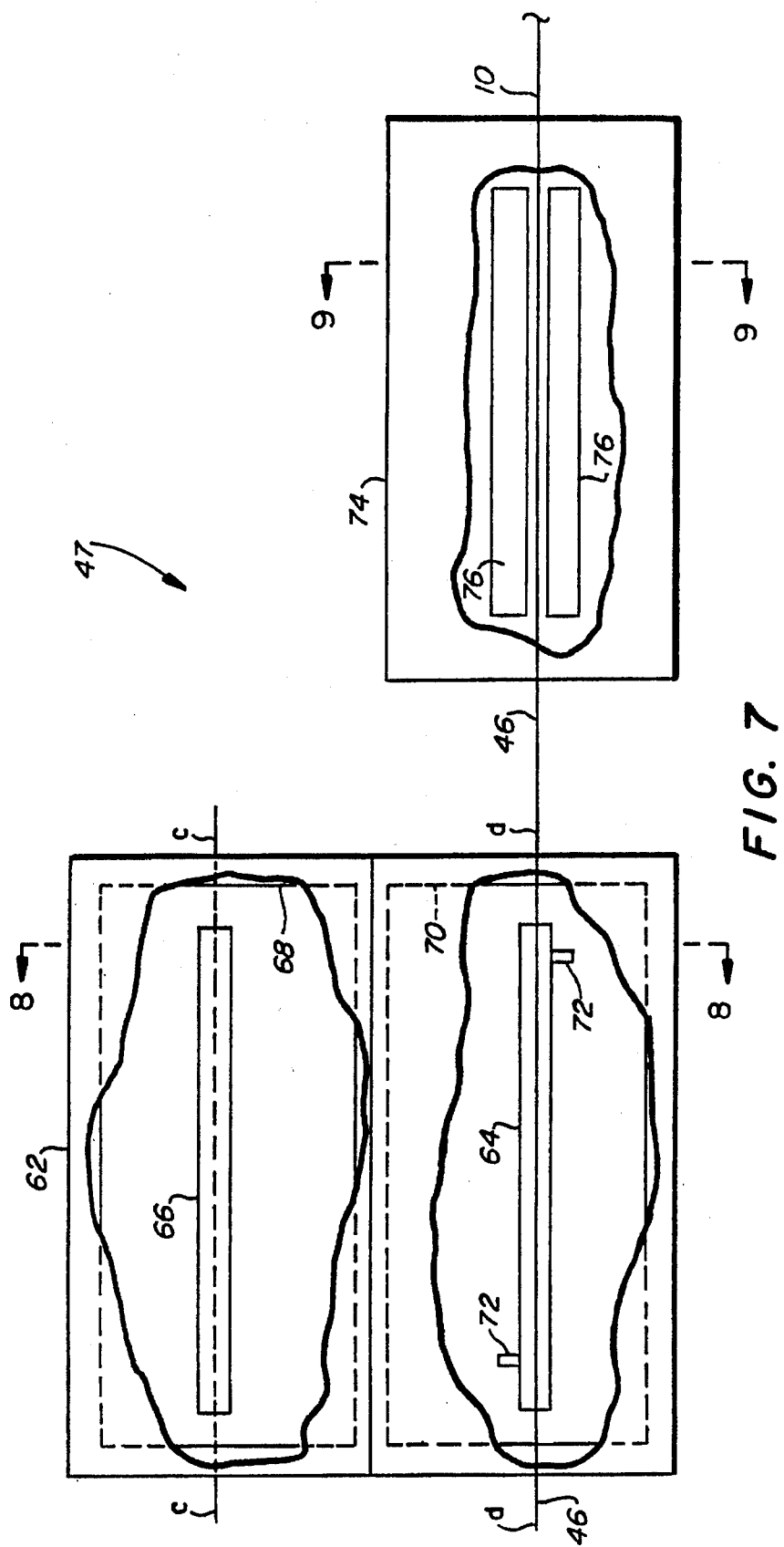

5,593,736

PROCESS FOR MANUFACTURING A FIBER REINFORCED OPTIC MICROCABLE WITH A UV CURED RESIN

STATEMENT OF GOVERNMENT INTEREST

The invention described herein may be manufactured and used by or for the Government of the United States of America for governmental purposes without the payment of any royalties thereon or therefor.

This case relates to copending Application entitled "Fiber Optic Microcable Produced with Radiation Cured Composite" by Steven J. Cowen, et al., U.S. Navy Case No. 70,677, U.S. Patent and Trademark Office Ser. No. 197,491, filed May 23, 1988, now U.S. Pat. No. 5,259,055, and "STRUCTURAL COMPOSITE MATERIAL UTILIZING RADIATION CURED POLYMER", by Steven J. Cowen, et al., U.S. Navey Case No. 70,676, U.S. Patent and Trademark Office Ser. No. 263,450, filed Oct. 27, 1988.

BACKGROUND OF THE INVENTION

The present invention generally relates to the field of fiber optic communications and more particularly to fiber optic cables. Specifically, the present invention provides a process for fabricating a fiber optic microcable composed of materials having properties which facilitate its manufacture.

A fiber optic microcable is basically comprised of a glass or plastic fiber core, a buffer, and a protective sheath. The protective sheath is typically composed of a heat polymerized organic resin impregnated with reinforcing fibers. Conventional resin materials are typically polymerized or cured at temperatures which may exceed 200° C. These temperatures can damage the ultraviolet light cured buffer layers present on state-of-the-art optical fibers resulting in unacceptable degradation of optical performance. One alternative is to use heat resistant buffer layers composed of silicone, rubber or thermoplastic. However, these materials greatly increase the costs of the microcable. An alternative to using expensive buffer materials is to increase the exposure time of the resin to a more moderate curing temperature for a longer period of time as compared to curing the resin at higher temperatures. This solution disadvantageously requires either a very long production oven which may be 100 to 200 feet long or a microcable production rate limited to approximately four inches per second. Both of these methods increase the microcable production costs.

A further problem associated with heat curable polymeric sheathing materials is that the sheathing tends to deform while curing, causing the microcable to become out of round. This results in a microcable having a nonuniform, noncircular cross section which creates difficulties when precision winding the microcable onto spools. Still another problem with heat curable polymeric resins is limited pot life which sets an upper limit on the continuous length of fiber optic microcable which can be fabricated in a given production run. Physical properties of heat curable resins tend to vary throughout their pot lives thereby creating additional manufacturing difficulties. All of these problems combine to increase the costs of fiber optic microcable applications and limit the maximum obtainable continuous lengths of microcable to at most 10 kilometers. Therefore, there is a continuing need to develop a fiber optic microcable which can be more readily manufactured to greater lengths within acceptable tolerances and costs.

SUMMARY OF THE INVENTION

The present invention provides a process for manufacturing fiber optic microcable that overcomes the manufacturing problems and cost disadvantages inherent in the prior art. The fiber optic microcable includes an optical fiber core surrounded by a buffer and a protective sheath. The sheath consists of an ultraviolet light curable resin which may be impregnated with fibers to enhance the physical strength characteristics of the microcable. The resin polymerizes almost instantaneously upon exposure to ultraviolet light. This permits the microcable to be manufactured at rates greater than 1 meter per second by processing it through an ultraviolet light bath having a length of 1 meter or less. Because curing takes place almost immediately, there is no tendency for the resin to sag out of round as there is for microcable cured in a long oven. Therefore, the resulting microcable is uniformly round over its entire length. Another significant advantage with microcables having an outer sheath composed of an ultraviolet light curable resin is that the resin temperatures attained during polymerization are less than 100° C. as opposed to temperatures greater than 200° C. for heat curable resins. The lower temperatures enable the microcables to be fabricated with standard state-of-the-art telecommunications optical fiber using ultraviolet light cured buffers which are relatively inexpensive.

The invention is easy to manufacture. Fibers which may be fiberglass yarns are dispensed from storage bobbins at constant tension. The yarns are wetted in a temperature controlled bath containing an ultraviolet light curable resin through which the yarns pass over and under a series of metal pins to force out any air entrained in the wetted yarns and to thoroughly work heated resin into the yarns. The wetted yarns are passed through a comb plate which radially orients them around an optical fiber core and buffer. The optical fiber core, buffer and wetted yarns are passed through a circular aperture of a heated forming die to form a matrix. The die aperture diameter determines the microcable diameter and, consequently, the fiber to resin ratio of the matrix. The matrix is then exposed to a single-stage, high intensity ultraviolet light bath which cures the resin to transform the matrix into a fiber optic microcable. The completed microcable then is reeled at constant speed onto a storage spool. The spooled microcable may be stress relieved by heat soaking it at approximately 70° C. for four hours and then letting it air cool.

An alternative method to single-stage curing is to expose the matrix to a medium intensity ultraviolet light bath. The intensity of this dosage partially cures an outer layer of resin whereby the matrix remains at a relatively cool temperature. The matrix is then exposed to a low intensity ultraviolet light bath which completes the curing process. The two stage method has the advantage of inducing a lower temperature rise on the microcable than does the aforementioned single stage curing method. The completed fiber optic microcable is then reeled at constant speed onto a storage spool and then may be stress relieved as described above.

OBJECTS OF THE INVENTION

A first object of the invention is to manufacture a fiber optic microcable that has a uniformly round cross section over the length of the microcable.

A second object is to manufacture a microcable in lengths that exceed 10 kilometers.

A third object is to provide a process for manufacturing fiber optic microcable which can be cured at less than 100° C.

A fourth object is to provide a process for fabricating fiber optic microcable at a rate which exceeds 1 meter per second.

A fifth object is to provide a process for fabricating fiber optic microcable wherein the microcable can be cured in an ultraviolet light bath 1 meter in length or less.

A sixth object is to provide a process for manufacturing fiber optic microcable which does not damage the fiber optic buffer.

A seventh object is to provide a process for fabricating fiber optic microcable wherein the microcable can be cured upon exposure to electromagnetic radiation.

Other objects, advantages and novel features of the invention will become apparent from the following detailed description of the invention when considered in conjunction with the accompanying drawings.

BRIEF DESCRIPTION OF THE DRAWINGS

FIG. 7 is a plan view of the two-stage ultraviolet light curing station.

DESCRIPTION OF THE PREFERRED EMBODIMENT

Figure 1:
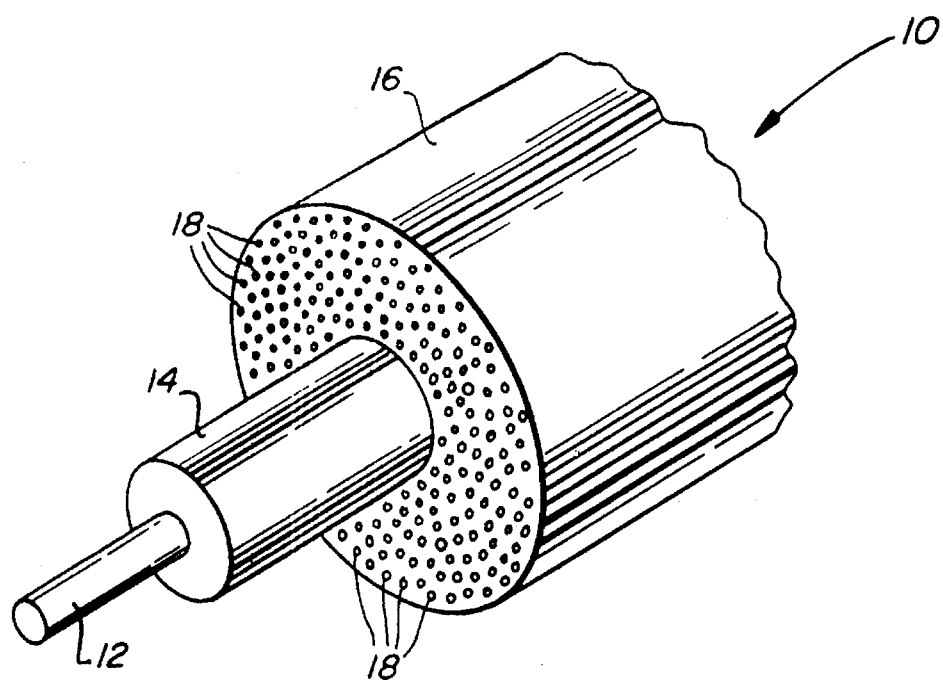
FIG. 1 is a breakaway view of the fiber optic microcable.

Referring now to FIG. 1 wherein like reference numerals designate light or similar parts throughout the several views, there is illustrated a fiber optic microcable 10 for conveying pulses of light. The microcable includes an optical fiber core 12 surrounded by a buffer 14 and a protective sheath 16 composed of an ultraviolet light cured polymeric resin impregnated with reinforcing fibers 18. Reference to the optical fiber core implicitly includes reference to cladding (not shown) and substrate (not shown) surrounding the core. It is to be understood that all hereinafter references to the core also refer to the cladding and substrate. Fibers 18, which may be fiberglass filaments grouped as yarns or rovings, enhance the resistance of the microcable to physical damage. Although the fibers have been described as being composed of fiberglass, it is to be understood that it is within the scope of this invention for the fibers to be composed of other materials, as for example, boron, nylon, carbon graphite, or aromatic polyamide polymers such as "KEVLAR®", a product of the Dupont Chemical Corporation, and which may be grouped as yarns, rovings or single filaments. The fibers are radially suspended in the resin around and parallel to optical fiber core 12. The reinforcing fibers may constitute 20 to 90 percent by volume of the fiber/resin composite mixture.

Microcable 10 has a uniformly concentric cross sectional area attributable to rapid cure of the ultraviolet light curable resin. Although fibers 18 have been described as running parallel to optical fiber core 12, it is within the scope of the invention for fibers 18 to be suspended in other patterns in the resin, as for example a helical or woven pattern around optical fiber core 12.

Figure 4:
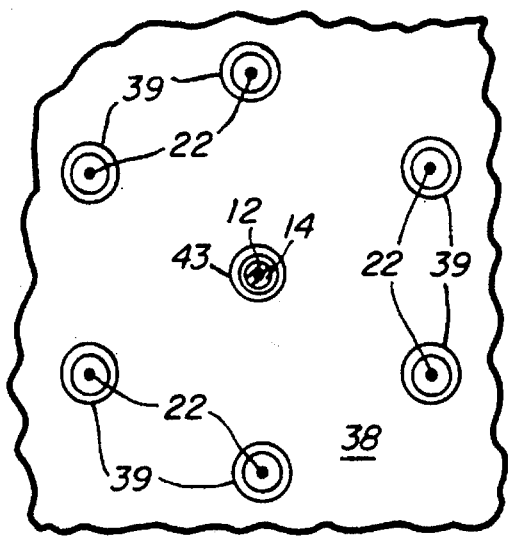
FIG. 4 is a view of the comb plate along line 4—4 of FIG. 2.
Figure 3:
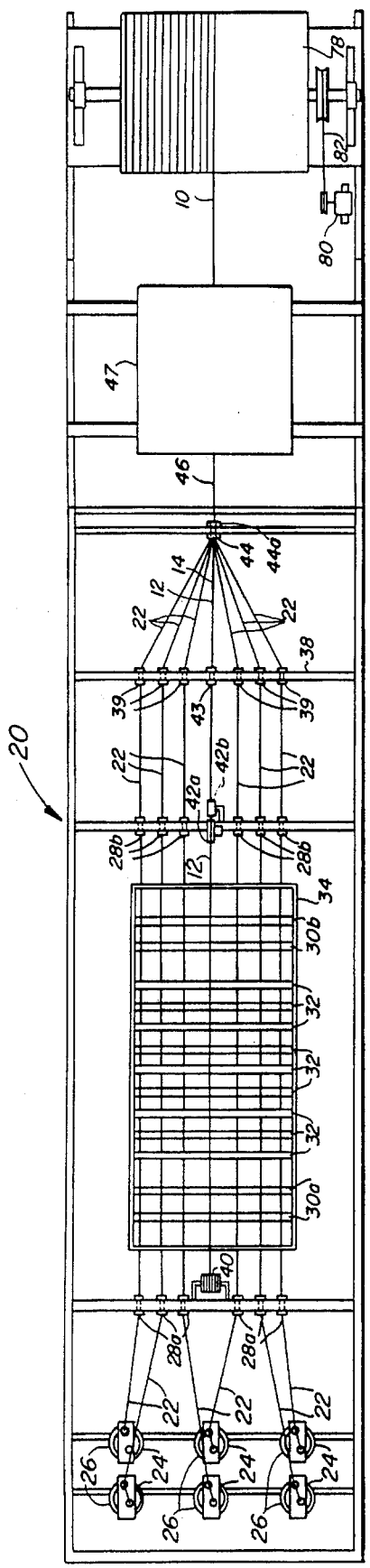
FIG. 3 is a plan view of a machine for manufacturing fiber optic microcable.
Figure 2:
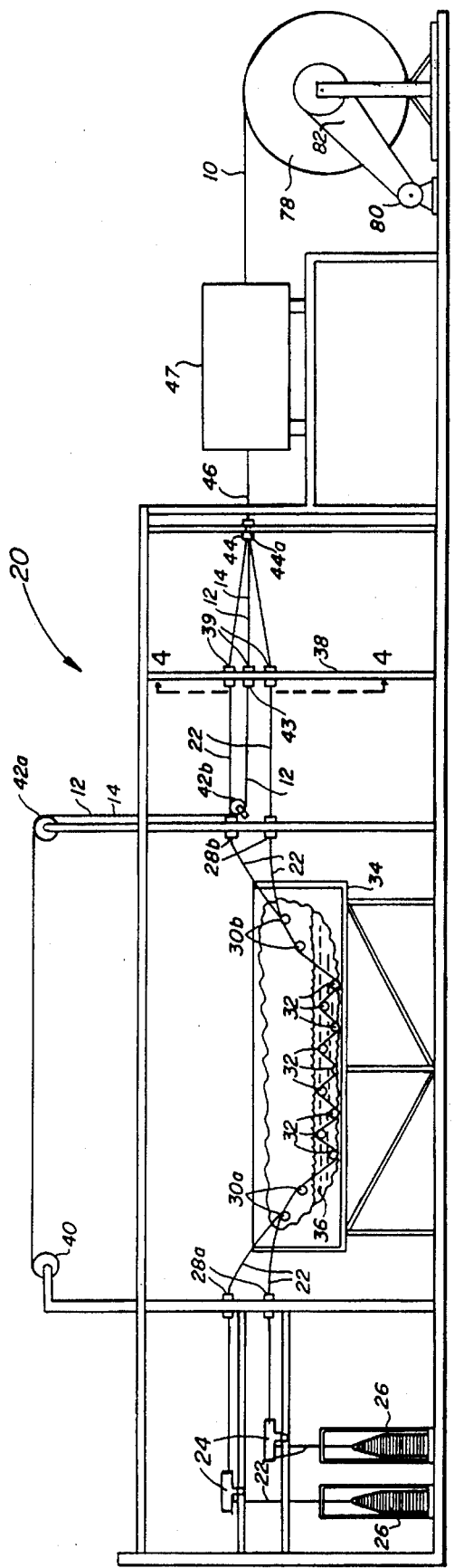
FIG. 2 is an elevation view of a machine for manufacturing fiber optic microcable.

FIGS. 2 and 3 show a machine 20 for manufacturing fiber reinforced, ultraviolet light curable optic fiber microcable 10 fabricated by dispensing fiberglass yarns 22 from storage bobbins 26. The yarns are subjected to back tension, which may be 0.1 Newton, controlled by textile tensioners 24. The yarns are individually drawn through ceramic guides 28a and then over a first set of guide pins 30a. The yarns proceed through a staggered series of metal pins 32 in a temperature controlled wetting pan 34 containing an ultraviolet light curable resin 36. The resin is maintained between 27° and 70° C. in which yarns 22 are wetted. Any air which may become entrapped in the yarns is released as the wetted yarns pass over and under metal pins 32. Referring to FIGS. 2, 3 and 4 collectively, the wetted yarns are drawn over a second set of guide pins 30b, exit wetting pan 34 and then individually pass through ceramic guides 28b. The wetted yarns proceed through ceramic guides 39 mounted in comb plate 38 so that yarns 22 are radially positioned around optical fiber core 12 and buffer 14. The fiber core and buffer are integrally fed from a spool 40, around sheaves 42a and 42b, and on through ceramic guide 43 mounted in comb plate 38. Although FIGS. 2, 3 and 4 depict six yarns 22 being processed, it is to be understood that FIGS. 2, 3 and 4 represent the invention by way of example only. Within the scope of the invention, fewer or greater numbers of yarns 22 may be utilized than are actually shown.

After exiting comb plate 38, yarns 22 and optical fiber core 12 with accompanying buffer 14 converge as they pass through a circular aperture 44 of a heated ceramic forming die 44a to form a matrix 46 as shown in FIGS. 2 and 3. The diameter of aperture 44 determines the diameter and fiber/resin ratio of microcable 10.

Numerical reference 47 represents alternative species of methods for curing matrix 46. The first species is encompassed within lamp housing 48 illustrated in FIGS. 5 and 6. The second species is encompassed within lamp housings 62 and 74 illustrated in FIGS. 7, 8 and 9.

Figure 6:
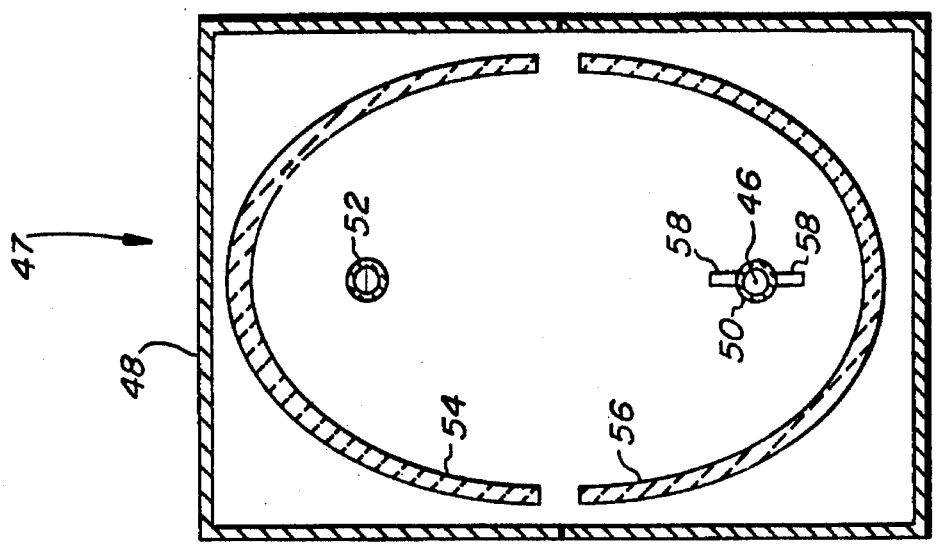
FIG. 6 is a cross-sectional end view of the single-stage ultraviolet light curing station along line 6—6 of FIG. 5.
Figure 5:
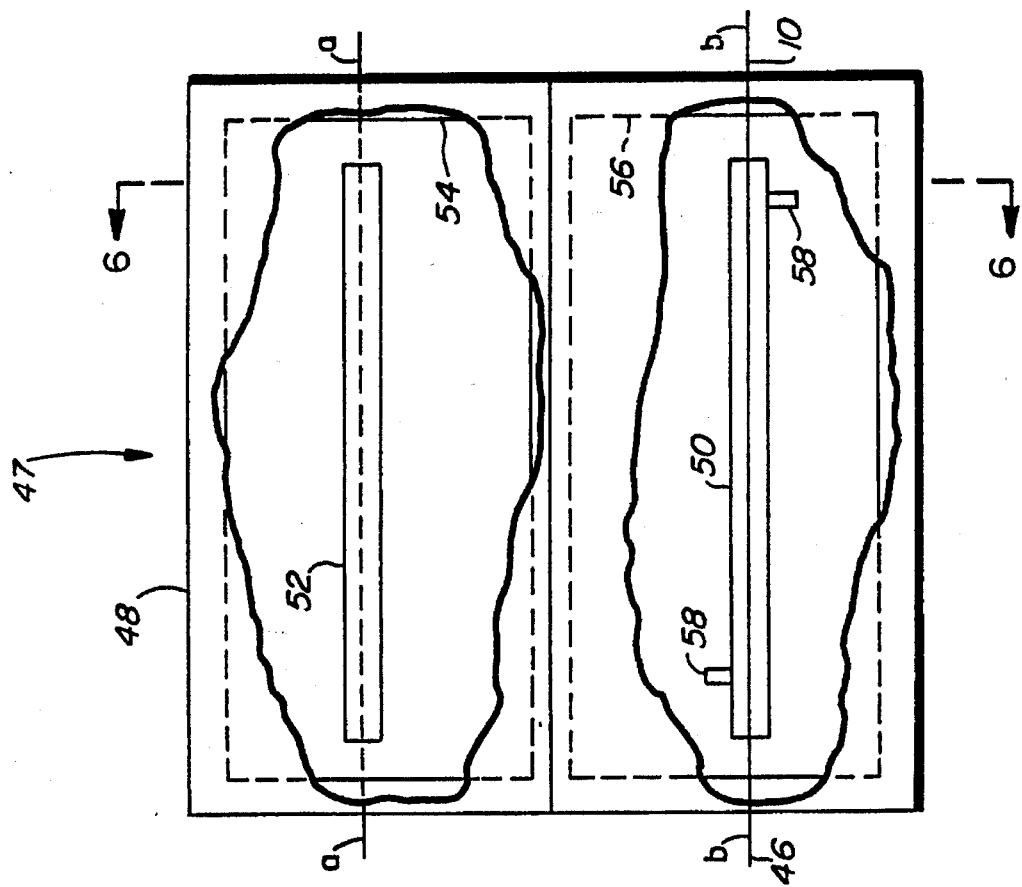
FIG. 5 is a plan view of a single-stage ultraviolet light curing station.

A single-stage method for curing matrix 46 is illustrated in FIGS. 5 and 6 wherein after exiting aperture 44 shown in FIGS. 2 and 3, matrix 46 enters a lamp housing 48. The matrix passes through a quartz tube 50 within the lamp housing in approximately 0.5 seconds through which it is irradiated at an intensity of approximately 100,000 microwatts/cm$^2$ by a single-stage electromagnetic radiation source 52 emitting ultraviolet light at a wavelength of anywhere from 290 to 400 nanometers. Quartz tube 50 shields matrix 46 from infrared heat generated by electromagnetic radiation source 52 while being transparent to ultraviolet radiation. A quartz plate 53, which may be 0.32 cm thick is mounted between electromagnetic radiation source 52 and quartz tube 50 to further shield matrix 46 from infrared radiation. The longitudinal axis of electromagnetic radiation source 52 is coincident with a focal axis a—a of a semi-elliptically shaped mirror 54. The longitudinal axis of quartz tube 50 is coincident with a focal axis b—b of a semi-elliptically shaped mirror 56. The reflective concave surface of mirror 54 faces the reflective concave surface of mirror 56 so that the reflective surfaces of both mirrors define an elliptical mirror having focal axes a—a and b—b.

Ultraviolet light from electromagnetic radiation source 52 both propagates directly towards matrix 46 and reflects off of mirror 54 to mirror 56, and then converges on focal axis b—b so that matrix 46 is irradiated from a 360° field. Dry nitrogen injected into quartz tube 50 through nipples 58 displaces oxygen which can inhibit polymerization of matrix 46 and cools the matrix while it cures. Matrix 46 cures almost instantaneously upon exposure to the ultraviolet light and is thus transformed into a completed microcable 10.

Figure 8:
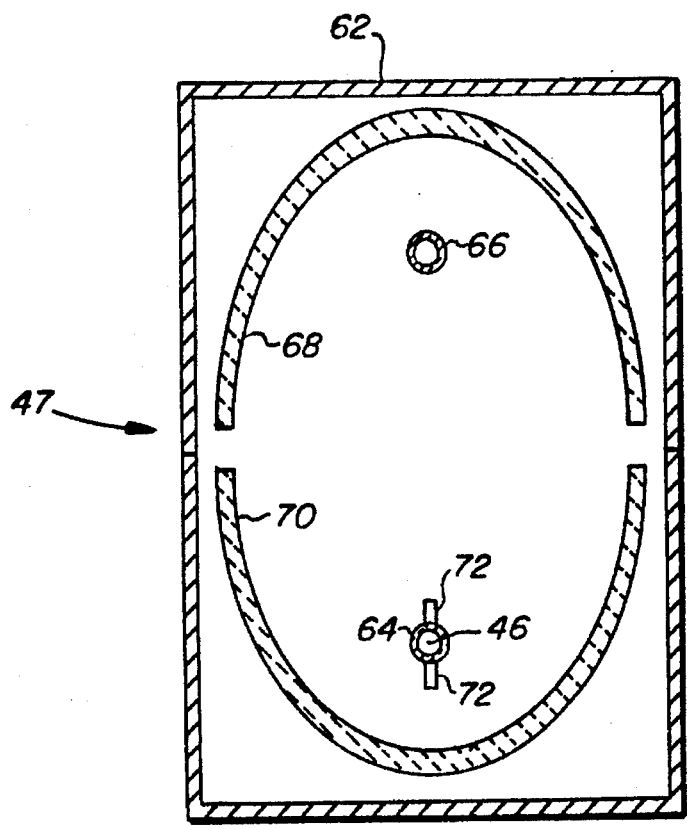
FIG. 8 is a cross-sectional end view of the medium intensity ultraviolet light curing station along line 8—8 of FIG. 7.
Figure 9:
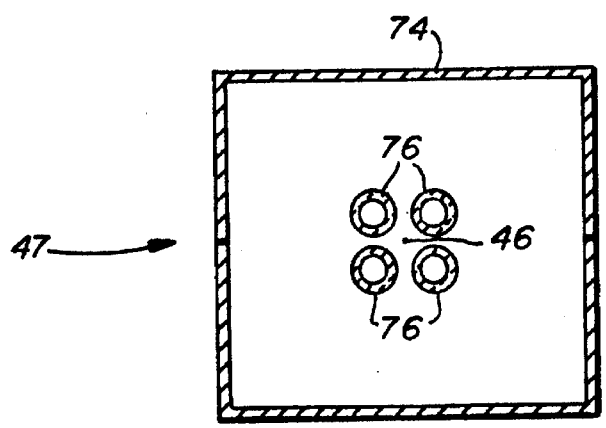
FIG. 9 is a cross-sectional view of the low intensity ultraviolet light curing station along line 9—9 of FIG. 7.

An alternative to the single-stage method for curing matrix 46 as described above, is a two-stage curing method illustrated in FIGS. 7, 8, and 9, collectively, wherein after exiting aperture 44 shown in FIGS. 2 and 3, matrix 46 enters lamp housing 62. Within the lamp housing, the matrix passes through a quartz tube 64 through which it is irradiated at a medium intensity of 5000 to 10,000 microwatts/cm$^2$ by an electromagnetic radiation source 66 emitting ultraviolet light at a wavelength of approximately 290 nanometers. The ultraviolet light polymerizes an outer layer of matrix 46. Quartz tube 64 shields matrix 46 from infrared heat generated by electromagnetic radiation source 66 while being transparent to ultraviolet radiation. The longitudinal axis of electromagnetic radiation source 66 is coincident with a focal axis c—c of a semi-elliptically shaped mirror 68. The longitudinal axis of quartz tube 64 is coincident with a focal axis d—d of a semi-elliptically shaped mirror 70. The reflective concave surface of mirror 68 faces the reflective concave surface of mirror 70 so that the reflective surfaces of both mirror define an elliptical mirror having focal axis c—c and d—d.

Ultraviolet light from electromagnetic radiation source 66 both propagate directly towards matrix 46 and reflects off of mirror 68 to mirror 70, and then converges on focal axis d—d so that matrix 46 is irradiated from a 360° field. Dry nitrogen injected into quartz tube 64 through nipples 72 displaces oxygen which can inhibit polymerization of the outer layer of matrix 46 and cools the matrix while it cures.

Referring to FIGS. 7, 8, and 9, collectively, after existing lamp housing 62, partially cured matrix 46 enters lamp housing 74 where it passes between four low intensity ultraviolet lamps 76 which irradiate matrix 46 with ultraviolet light having a wavelength of about 360 nanometers at a relatively low intensity of approximately 2,000 microwatts/cm$^2$. This second curing stage completes polymerization of matrix 46 into a completely cured microcable 10. The purpose of this two-stage process is to limit the overall temperature rise of the curing microcable matrix to no more than 100° C.

Returning to FIGS. 2 and 3, after curing, completed fiber optic microcable 10 is then taken up at constant speed onto a storage spool 78 driven by means readily understood by one skilled in this art, as for example, by an electric motor 80 coupled to the spool by a "V"-belt 82. The fiber optic microcable may then be stress relieved by soaking the spooled fiber optic microcable in an approximately 70° C. atmosphere for about four hours and then allowing it to air cool.

A suitable resin has a Young's Modulus ranging from approximately 700,000 to 2,500,000 kPa after cure, a post-cure tensile strength of approximately 28,000 to 56,000 kPa, an uncured viscosity of less than 100 centipoise at 27° C., moisture resistance of less than one percent in 24 hours of water immersion after cure, strain to failure of 1½% after cure, and a glass transition temperature from 60° C. to 105° C. after cure. Furthermore, resin 36 polymerizes or cures when exposed to electromagnetic radiation having a wavelength anywhere from 290 to 400 nanometers. Good results have been obtained with ultraviolet light curable resins such as DeSoto, Incorporated No. 3287-5-7, Master Bond, Inc. No. 17D-1 and Loctite Corp. No. FMD82.

While the invention has been described as having used ultraviolet light curable resin, it is to be understood that it is within the scope of the invention for other electromagnetic radiation curable resins to be used, as for example, resin cured upon exposure to visible light or electron beam radiation in conjunction with an electromagnetic radiation source having a wavelength capable of polymerizing the resin. The inventive process herein described may be utilized for fabricating any type of fiber reinforced microcable having an electromagnetic radiation curable sheath 16.

Obviously, many modifications and variations of the present invention are possible in the light of the above teachings. It is therefore to be understood that within the scope of the appended claims the invention may be practiced otherwise than as specifically described.

We claim:

1. A process for fabricating a fiber reinforced fiber optic microcable comprising the steps of:

wetting a plurality of fibers with an ultraviolet light curable resin having a post-cure Young's modulus ranging from approximately 700,000 to 2,500,000 kPa, a post-cure tensile strength of approximately 28,000 to 56,000 kPa, a post-cure moisture resistance of less than one per cent after 24 hours of water immersion, an uncured viscosity of less than 100 centipoise at 27° C., a strain to failure of 1½ per cent after cure, and a glass transition temperature ranging anywhere from 60° C. to 105° C. after cure;

placing the wetted fibers around a buffered optical fiber core to form a matrix;

curing said matrix with ultraviolet light having a wavelength any where from 290 to 400 nanometers; and cooling said curing matrix in a nitrogen atmosphere.

2. The process of claim 1 including:

curing said matrix by exposing said matrix to ultraviolet light having an intensity I, incident upon said matrix, where I<100,000 microwatts/cm$^2$.

3. The process of claim 2 further including:

heating said ultraviolet light curable resin to facilitate wetting said fibers.

4. The process of claim 3 wherein said step of placing said wetted fibers around said buffered optical fiber core to form said matrix further comprises the step of:

passing said wetted fibers and said buffered optical fiber core through a forming die.

5. The process of claim 4 wherein the step of placing said wetted fibers around said buffered optical fiber core to form said matrix further comprises the step of:

passing said wetted fibers and buffered optical fiber core through a comb plate before passing said wetted fibers and said buffered optical fiber core through said forming die.

6. The process of claim 5 including:

purging any air entrained from said resin of said wetted fibers.

7. The process of claim 6 including:

stress relieving said matrix by soaking said matrix in an atmosphere having a temperature of approximately 70° C. for about four hours.

8. The process of claim 1 including:

partially curing said matrix by exposing said matrix to ultraviolet light having a wavelength of approximately 290 nanometers at an intensity I, incident upon said matrix, where 5,000 microwatts/cm$^2$<I<10,000 microwatts/cm$^2$;

completely curing said matrix by exposing said matrix to ultraviolet light having an intensity of approximately 2,000 microwatts/cm$^2$ incident upon said matrix, said ultraviolet light having a wavelength of approximately 360 nanometers.

9. The process of claim 8 further including:

heating said ultraviolet light curable resin to facilitate wetting said fibers.

10. The process of claim 9 wherein said step of placing said wetted fibers around said buffered optical fiber core to form said matrix further comprises the step of:

passing said wetted fibers and said buffered optical fiber core through a forming die.

11. The process of claim 10 wherein said step of placing said wetted fibers around said buffered optical fiber core to form said matrix further comprises the step of:

passing said wetted fibers and buffered optical fiber core through a comb plate before passing said wetted fibers and said buffered optical fiber core through said forming die.

12. The process of claim 11 including:

purging any air entrained from said resin of said wetted fibers.

13. The process of claim 12 including:

stress relieving said matrix by soaking said matrix in an atmosphere having a temperature of approximately 70° C. for about four hours.

14. A process for fabricating a fiber reinforced fiber optic microcable comprising the steps of:

wetting a plurality of fibers with an ultraviolet light curable resin having a post-cure Young's modulus ranging from approximately 700,000 to 2,500,000 kPa, a post-cure tensile strength of approximately 28,000 to 56,000 kPa, and a post-cure moisture resistance of less than one per cent after 24 hours of water immersion, an uncured viscosity of less than 100 centipoise at 27° C., a strain to failure of 1½ per cent after cure, and a glass transition temperature ranging anywhere from 60° C. to 105° C. after cure;

placing said wetted fibers around a buffered optical fiber core to form a matrix;

curing said matrix with ultraviolet light; and cooling said curing matrix in a nitrogen atmosphere.

15. The process of claim 14 further including:

heating said ultraviolet light curable resin to facilitate wetting said fibers.

16. The process of claim 15 wherein said step of placing said wetted fibers around said buffered optical fiber core to form said matrix further includes the step of:

passing said wetted fibers and said buffered optical fiber core through a forming die.

17. The process of claim 16 wherein said step of placing said wetted fibers around said buffered optical fiber core to form said matrix further comprises the step of:

passing said wetted fibers and buffered optical fiber core through a comb plate before passing said wetted fibers and said buffered optical fiber core through said forming die.

18. The process of claim 17 including:

purging any air entrained from said resin of said wetted fibers.

19. The process of claim 18 including:

stress relieving said matrix by soaking said matrix in an atmosphere having a temperature of approximately 70° C. for about four hours.

* * * * *